United States Patent
Leathers

(10) Patent No.: US 6,568,203 B1
(45) Date of Patent: May 27, 2003

(54) AIRCRAFT GROUND SUPPORT AIR CONDITIONING UNIT WITH COOLING TURBINE BYPASS

(75) Inventor: Thomas M. Leathers, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/136,201

(22) Filed: May 1, 2002

(51) Int. Cl.$^7$ ................................. F25D 9/00; F25B 9/00
(52) U.S. Cl. ................................ 62/402; 62/172; 62/87
(58) Field of Search ........................... 62/401, 402, 87, 62/172

(56) References Cited

U.S. PATENT DOCUMENTS

| | | |
|---|---|---|
| 3,675,438 A | 7/1972 | Takemasa et al. |
| 4,058,384 A | 11/1977 | Keefe |
| 4,148,333 A | 4/1979 | Nawa et al. |
| RE32,100 E * | 4/1986 | Rannenberg ............... 62/80 |
| 5,086,622 A * | 2/1992 | Warner ..................... 62/88 |
| 5,442,905 A * | 8/1995 | Claeys et al. ............. 60/785 |
| 5,626,166 A | 5/1997 | Hassan |
| 5,783,025 A | 7/1998 | Hwang et al. |
| 5,815,370 A * | 9/1998 | Sutton ..................... 361/699 |
| 5,887,445 A * | 3/1999 | Murry et al. .............. 62/402 |
| 5,899,085 A | 5/1999 | Williams |
| 6,243,966 B1 | 6/2001 | Lubomirsky et al. |
| 6,295,822 B1 * | 10/2001 | Mueller .................... 62/172 |
| 6,299,804 B1 * | 10/2001 | Domodossola et al. .. 264/37.17 |
| 6,326,597 B1 * | 12/2001 | Lubomirsky et al. ....... 219/494 |

* cited by examiner

*Primary Examiner*—William C. Doerrler
(74) *Attorney, Agent, or Firm*—Keith A. Newburry, Esq.

(57) ABSTRACT

A system and method of supplying temperature-controlled air to an aircraft environmental control system during ground support operations that uses an air amplifier to control the flow rate of cooling air through a heat exchanger. A heat exchanger removes heat from a flow of compressed air supplied to the air conditioning unit and supplies cooled compressed air at a predetermined temperature. The flow of the cooled compressed air is controlled by using the air amplifier.

13 Claims, 3 Drawing Sheets

AIRCRAFT GROUND SUPPORT AIR CONDITIONING UNIT WITH COOLING TURBINE BYPASS

FIELD OF THE INVENTION

The present invention relates to environmental control systems for aircraft and, more particularly, to a modular air conditioning unit for supplying temperature-controlled air to an aircraft environmental control system during ground support operations.

BACKGROUND OF THE INVENTION

Aircraft main engines not only provide propulsion for the aircraft, but in many instances may also be used to drive various other rotating components such as, for example, generators and pumps. The main engines may also be used to supply compressed air to the aircraft's environmental control system, which may be used to supply temperature-controlled air to both the aircraft cabin and to electronic equipment within the aircraft.

When an aircraft is on the ground and its main engines are not being used, an alternative power source may be used to supply power for ground support operations. In addition, during some ground support operations, an external supply of cooling and heating air may be used to supply temperature-controlled air to the cabin and aircraft equipment. For some type of aircraft ground support applications, most notably military aircraft ground support applications, a ground cart may be used to supply electrical power to the aircraft and compressed air to an air conditioning system module. The air conditioning module in turn may supply temperature-controlled air to the aircraft cabin and the aircraft's electronic equipment.

One particular air conditioning system module that may be used during aircraft ground support operations receives compressed air supplied by the ground cart, and conditions the compressed air to a predetermined temperature. The air conditioning system module may be used in either a cooling mode, to supply cool air, or in a heating mode, to supply warm air. To do so, the air conditioning system module may include a primary heat exchanger, a condenser, a moisture separator, and one or more cooling turbines. Typically, when the air conditioning system module is being used in the heating mode, all of the components within the system, including the cooling turbines, are operating. The air exhausted from the cooling turbines is relatively cold (e.g., <55 F.). Hence, to supply warm air to the aircraft at the desired temperature (e.g., 55–200 F.), a portion of the relatively hot (e.g., >300 F.) compressed air that is supplied to the air conditioning system module is diverted into cold air stream exhausted from the cooling turbines.

Although the above-described system and method for supplying warm air to an aircraft during ground support operations is effective, it suffers certain drawbacks. For example, because the cooling turbines are run in both the heating and cooling modes, the cooling turbines have relatively high operating hours, which can potentially reduce their operating lifetimes. Moreover, the operation of the cooling turbines in the heating mode is relatively inefficient, since the cooling turbines are used to cool the air and then this cooled air is subsequently warmed up.

Hence, there is a need for a system and method of providing temperature-controlled air to an aircraft environmental control system during ground support operations that does not use cooling turbines during a heating mode and/or is more efficient during than heat mode than presently known systems and methods. The present invention addresses one or more of these needs.

SUMMARY OF THE INVENTION

The present invention provides a system and method of supplying temperature-controlled air to an aircraft environmental control system during ground support operations that is simple, efficient, and does not adversely affect component lifetimes within the system.

In one embodiment of the present invention, and by way of example only, a temperature-controlled air supply system for use with a compressed air source and for connection to an aircraft on the ground includes an air amplifier, a first heat exchanger, a pressure control passage and a first valve. The air amplifier has at least a cooling air inlet port, a cooling air outlet port, an interior passageway therebetween, and a control air inlet port leading to the passageway. The first heat exchanger assembly is adapted to receive a flow of compressed air from the compressed air source and a flow of cooling air and to transfer heat from the compressed air to the cooling air and supply cooled compressed air. The pressure control passage has an inlet and an outlet, the inlet is configured to receive compressed air flow and the outlet is in fluid communication with the air amplifier control port. The first valve is mounted on the control pressure passage and is selectively moveable to control compressed air flow rate and pressure to the air amplifier control air inlet port.

In another exemplary embodiment, a method of supplying temperature-controlled air to at least one section of an aircraft during ground support operations includes flowing compressed air through a heat exchanger, and cooling air through an air amplifier and the heat exchanger to thereby cool the compressed air to a predetermined temperature. A flow of a portion of the compressed air to a control port of the air amplifier is controlled to thereby control the flow of the cooling air through the heat exchanger, whereby the predetermined temperature of the cooled compressed air is controlled.

Other independent features and advantages of the preferred air conditioning system will become apparent from the following detailed description, taken in conjunction with the accompanying drawings which illustrate, by way of example, the principles of the invention.

DETAILED DESCRIPTION OF VARIOUS EMBODIMENTS

Figure 1:
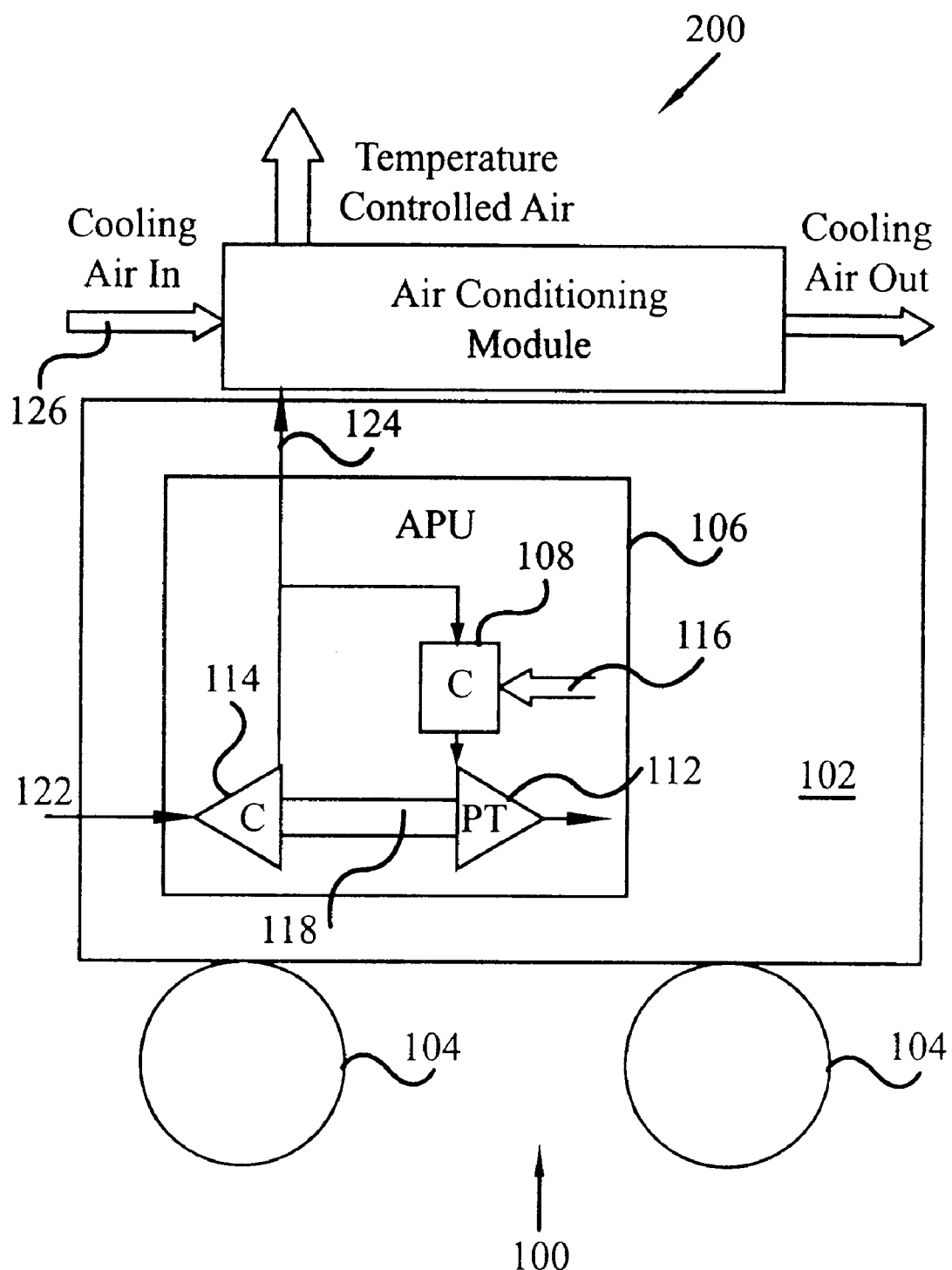
FIG. 1 is a simplified schematic diagram of a ground cart with a modular aircraft ground support air conditioning unit mounted thereon.

A simplified schematic representation of a ground cart 100 with a modular aircraft ground support air conditioning unit 200 mounted thereon is depicted in FIG. 1. The ground cart 100 includes a housing 102 and varying numbers of rotationally mounted wheels 104, which allow the cart 100 to be readily transported to one or more aircraft. Various systems and components may be mounted within the housing 102 to supply power and compressed air for ground support operations. In the depicted embodiment, an auxiliary power unit (APU) 106 is depicted. It should be appreciated that other systems and components may also be installed in the ground cart 100, but for the sake of clarity and ease of description, only a single APU is depicted.

The APU 106 includes a combustor 108, a power turbine 112, and a compressor 114. During APU operation, the combustor receives fuel 116 from a fuel source (not illustrated) and supplies high energy air to the power turbine 112 causing it to rotate. The power turbine 112 includes a shaft 118 that may be used to drive a generator (not illustrated) for supplying electrical power, and to drive the compressor 114. The compressor 114 draws in ambient air 122, compresses it, and supplies compressed air 124 to the air conditioning module 200. It should be appreciated that the present invention is not limited to use with an APU as the compressed air source, and that various other devices and systems for supplying compressed air to the air conditioning unit 200 may also be used. For example, a diesel engine driving a compressor or other engine-compressor types, or any type of stationary compressor, may also be used to provide compressed air.

The air conditioning unit 200 receives the compressed air 124 from the APU 106, and cooling air 126 from an air source such as, for example, ambient air, that flows into and through the air conditioning unit 200. The air conditioning unit 200 functions to supply temperature-controlled air 128 to, for example, the environmental control system (ECS) in an aircraft. To accomplish this function, the air conditioning unit 200, as depicted more clearly in schematic form in FIG. 2, includes a first heat exchanger 202, a second heat exchanger 204, a water separator 206, a cooling turbine 208, and an air amplifier 212. The first heat exchanger 202 is coupled to receive the compressed air 124 supplied from the APU 106. The compressed air 124 flows through the first heat exchanger 202 and is cooled by the cooling air 126 that also flows through the first heat exchanger 202.

The compressed air that is cooled in the first heat exchanger 202 either flows through the second heat exchanger 204 or is diverted around the second heat exchanger 204, via a valved bypass line 214, to a temperature-controlled air outlet port 216. In particular, when the air conditioning unit 200 is being operated in the cooling mode, a bypass valve 218 mounted in the bypass line 214 is closed and the cooled compressed air from the first heat exchanger 202 flows through the second heat exchanger 204. Conversely, when the air conditioning unit is being operated in the heating mode, the valve 218 is open and a stop valve 220 positioned downstream of the bypass line 214 is closed. As a result, the cooled compressed air from the first heat exchanger 202 flows through the bypass line 214 and out the temperature-controlled air outlet port 216, rather than through the second heat exchanger 204. For completeness, air conditioning unit operations in both the cooling and heating modes will be described, beginning first with the cooling mode.

In the second heat exchanger 204, the cooled compressed air from the first heat exchanger 202 is further cooled by another flow of air. Specifically, air that is exhausted from the cooling turbine 208 is also directed through the second heat exchanger 204, and is used to further cool the compressed air from the first heat exchanger 202. The cooling turbine exhaust air that is warmed by the compressed air in the second heat exchanger 204 flows out the temperature-controlled air supply port 216.

The further cooled compressed air flowing out of the second heat exchanger 204 may contain moisture. Therefore, this air is directed through the water separator 206. The water separator 206 may be any one of numerous devices known in the art for removing moisture from a flowing gas. In a particular preferred embodiment, the water separator 206 is the type that removes moisture by centrifugally separating free water droplets from the air flow, and exhausting the free water. Thereafter, the dry, further cooled compressed air that exits the water separator 206 is directed into the cooling turbine 208. The air impinges upon rotating blades (not illustrated) in the cooling turbine 208, causing the blades to rotate. As the air impinges on the rotating blades, work is extracted from the air, cooling it even further. As noted above, the air exhausted from the cooling turbine 208 is then directed through the second heat exchanger 204 where it is warmed and directed out the temperature-controlled air supply port 216.

As was previously noted, when the air conditioning unit is operating in the heating mode, the second heat exchanger 204, the water separator 206, and the cooling turbine 208 are not used. Instead, the valve 218 in the bypass line 214 is open and the stop valve 220 downstream of the bypass line 214 is closed. Thus, the cooled compressed air that exits the first heat exchanger 202 flows through the bypass line 214 and out the temperature-controlled air outlet port 216, rather than through the second heat exchanger 204, the water separator 206, and the cooling turbine 208. In the depicted embodiment the stop valve 220 is positioned is the flow path between the second heat exchanger 204 and the water separator 206. It should be appreciated however, that the present invention is not limited to this configuration, and that the stop valve could also be positioned upstream of the second heat exchanger 204 and downstream of the bypass line 214, or at any one of numerous other positions downstream of the bypass line 214, the second heat exchanger 204, the moisture separator, or the cooling turbine 208.

Figure 3:
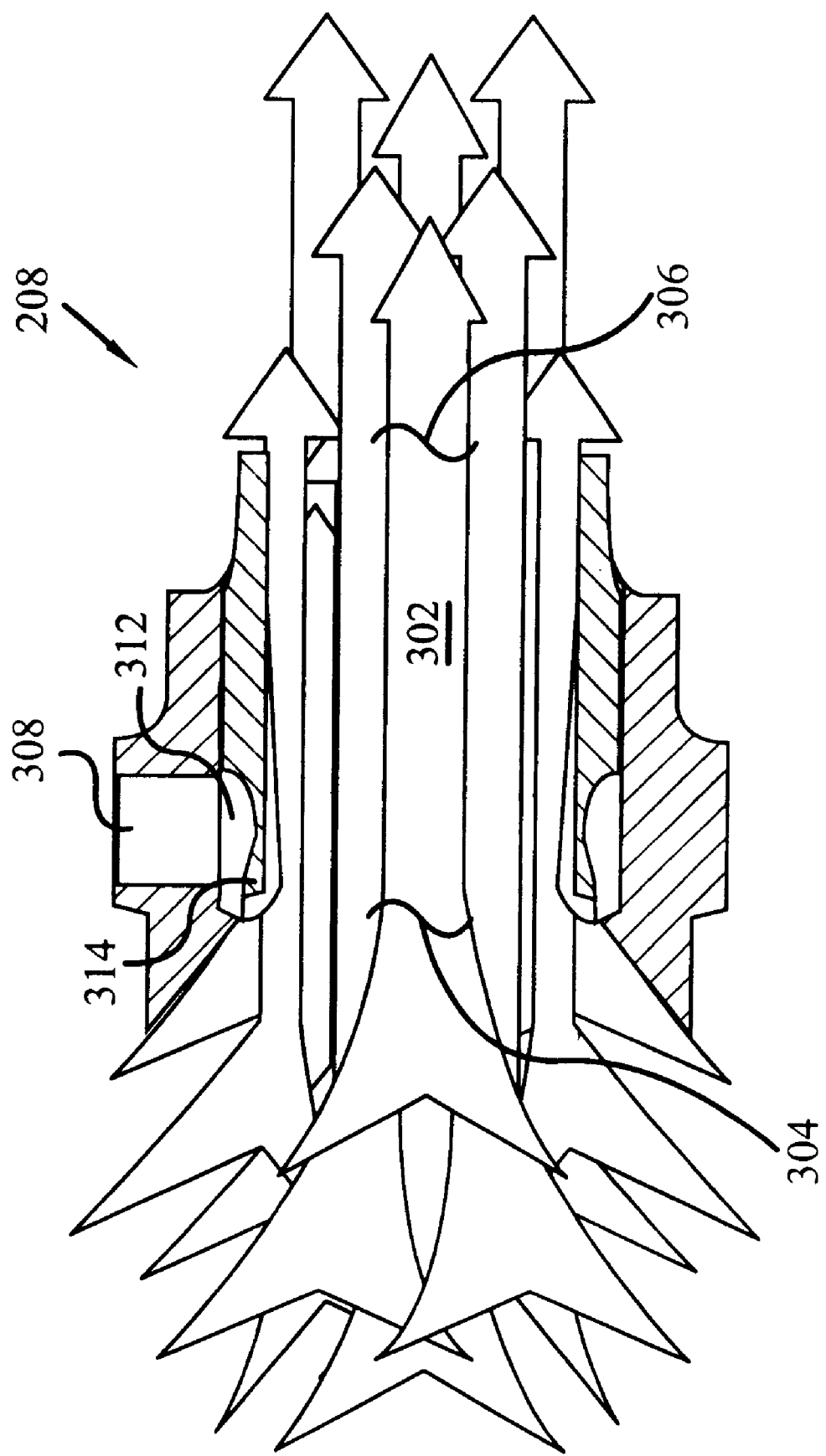
FIG. 3 is a schematic representation of an exemplary air amplifier that may used with the system depicted in FIG. 2.

The temperature that the air exits the temperature-controlled air outlet port 216 in the heating mode is controlled by controlling the flow rate of cooling air 126 through the first heat exchanger 202, which is in turn controlled by controlling the flow rate of cooling air 126 flowing through the air amplifier 212. With reference now to FIG. 3, the operation of the air amplifier 212 will be described. The air amplifier 212 includes a flow passage 302 having an inlet port 304 and an outlet port 306. The air amplifier 212 additionally includes a control air inlet port 308 that leads into an annular chamber 312. Air flow directed into the control air inlet port 308 flows into the annular chamber 312, and is throttled through a gap 314. This stream of air adheres to the Coanda effect as it follows the profile of the passage 302. This flow of air creates a low pressure area at the inlet port 304, inducing a high flow of air through the passage 302 and out the outlet port 306. The flow rate through the passage 302 can be controlled by controlling the flow rate of air into the control air inlet port 308.

Returning now to FIG. 2, the air amplifier control air inlet port 308 is coupled to a control pressure passage 222, which has an inlet coupled to receive a portion of the compressed air 124 that is supplied to the air conditioning unit 200. A valve assembly 224, such as a throttle valve, is mounted across the control pressure passage 222, and is used to control the flow rate of compressed air 124 to the control air inlet port 308. Thus, the flow rate of cooling air 126 through the air amplifier 212, and thus the first heat exchanger 202, is controlled by controlling the position of the throttle valve 224.

Figure 2:
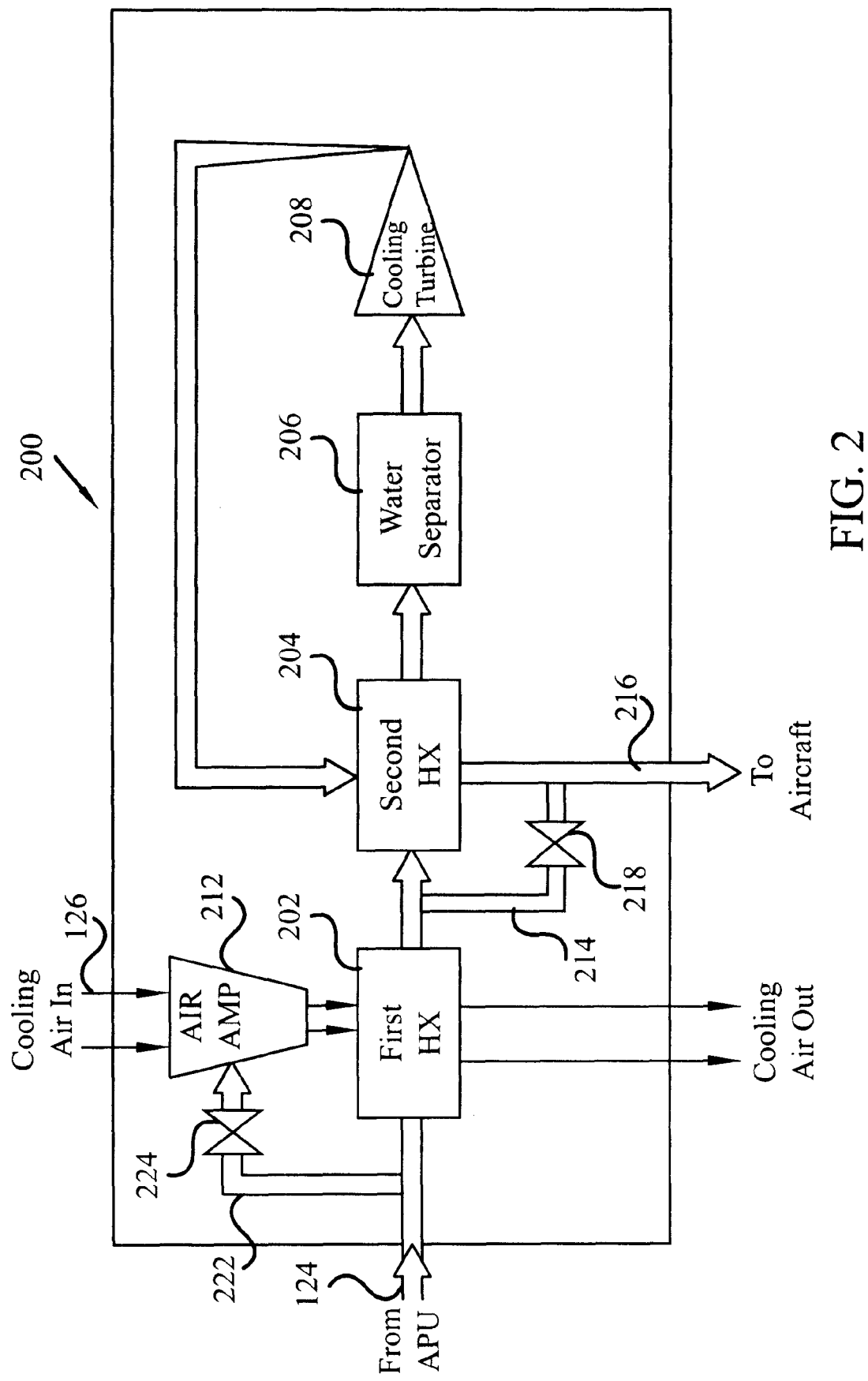
FIG. 2 is a schematic representation of an exemplary embodiment of a system according to an embodiment of the present invention that may be installed in modular air conditioning unit depicted in FIG. 1.

In the embodiment depicted in FIG. 2, the air amplifier 212 is configured at the inlet of the first heat exchanger 202, to thereby "push" the cooling air 126 through the first heat exchanger 202. It should be appreciated that the air amplifier 212 may also be configured at the outlet of the first heat exchanger 202, to thereby "pull" the cooling air 126 through the first heat exchanger 202. Moreover, while the control pressure passage 222 is depicted as tapping into the passage that supplies compressed air flow 124 to the first heat exchanger 202, it should be appreciated that it could also be a separate passage. In addition, although the bypass line 214 is shown as tapping into the line on the outlet of the second heat exchanger 204, it should be appreciated that it could also be a separate line.

When the air conditioning unit 200 is operating in the heating mode, the cooling turbine 208 does not operate. This is because the temperature of the air supplied to an aircraft via the temperature-controlled air outlet port 216 is controlled to the desired temperature by controlling the flow rate of cooling air flow through the air amplifier 212 and the first heat exchanger 202. Because the cooling turbine 208 is not operating, a portion of the relatively hot compressed air supplied to the first heat exchanger 202 is not diverted back into the air supplied to the aircraft, as is conventionally done. Thus, the life of the cooling turbine 208 should be extended, and the air conditioning unit 200 should operate more efficiently in the heating mode.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A temperature-controlled air supply system for use with a compressed air source and for connection to an aircraft on the ground, the air supply system comprising:

an air amplifier having at least a cooling air inlet port, a cooling air outlet port, an interior passageway therebetween, and a control air inlet port leading to the passageway;

a first heat exchanger assembly adapted to receive a flow of compressed air from the compressed air source and a flow of cooling air and to transfer heat from the compressed air to the cooling air and supply cooled compressed air;

a pressure control passage having an inlet and an outlet, the inlet configured to receive compressed air flow from the compressed air source and the outlet in fluid communication with the air amplifier control port; and a first valve mounted on the control pressure passage and selectively moveable to control compressed air flow rate and pressure to the air amplifier control air inlet port.

2. The system of claim 1, further comprising:

an air supply passage having an inlet and at least one outlet, the air supply passage inlet coupled to receive the cooled compressed air from the first heat exchanger; and a second valve mounted on the air supply passage and selectively moveable between an open and a closed position to control the flow rate of the cooled compressed air from the air supply passage outlet.

3. The system of claim 2, further comprising:

at least one cooling turbine having an air intake port and an air exhaust port;

a second heat exchanger coupled to receive the cooled compressed air from the first heat exchanger and turbine exhaust air from cooling turbine air exhaust port, and adapted to transfer heat from the cooled compressed air to the cooled air exhausted from the cooling turbine and supply warmed turbine exhaust air and further cooled compressed air.

4. The system of claim 3, wherein the cooling turbine air intake is coupled to receive the further cooled compressed air from the second heat exchanger.

5. The system of claim 4, further comprising:

a moisture separator coupled between the second heat exchanger and the cooling turbine air intake.

6. The system of claim 1, wherein the cooling air is ambient air.

7. The system of claim 1, wherein the compressed air source is an auxiliary power unit (APU).

8. The system of claim 2, further comprising:

a third valve positioned downstream of the air supply passage and between an open and a closed position to control the flow rate of the cooled compressed air to the second heat exchanger.

9. A method of supplying temperature-controlled air to at least one section of an aircraft during ground support operations, comprising:

flowing compressed air through a heat exchanger;

flowing cooling air through an air amplifier and the heat exchanger to thereby cool the compressed air to a predetermined temperature; and controlling a flow of a portion of the compressed air to a control port of the air amplifier to thereby control the flow of the cooling air through the heat exchanger, whereby the predetermined temperature of the cooled compressed air is controlled.

10. The method of claim 9, further comprising:

flowing the cooled compressed air through a second heat exchanger; and flowing cooling turbine exhaust air through the second heat exchanger to thereby further cool the cooled compressed air and warm the turbine exhaust air.

11. The method of claim 10, further comprising:

flowing the further cooled compressed air into an air intake of the cooling turbine.

12. The method of claim 9, further comprising:

supplying the cooling air from ambient surroundings.

13. The method of claim 9, further comprising:

supplying the compressed air from an auxiliary power unit (APU).

* * * * *